(12) United States Patent
Bui

(10) Patent No.: US 7,599,305 B2
(45) Date of Patent: Oct. 6, 2009

(54) SYSTEMS AND METHODS FOR PROVIDING COLLABORATION BETWEEN SYSTEMS

(75) Inventor: Thomas T. Bui, Irvine, CA (US)

(73) Assignee: The Boeing Company, Chicago, IL (US)

( * ) Notice: Subject to any disclaimer, the term of this patent is extended or adjusted under 35 U.S.C. 154(b) by 988 days.

(21) Appl. No.: 10/379,628

(22) Filed: Mar. 5, 2003

(65) Prior Publication Data

US 2004/0174822 A1 Sep. 9, 2004

(51) Int. Cl.
*H04L 12/26* (2006.01)
(52) U.S. Cl. .................... 370/252; 370/254; 370/400; 370/465; 370/466; 709/220; 709/223; 709/225; 709/227; 709/228; 709/230
(58) Field of Classification Search .................. 370/252, 370/254, 400, 465, 466; 709/220, 223, 225, 709/227, 228, 230
See application file for complete search history.

(56) References Cited

U.S. PATENT DOCUMENTS

| | | | | |
|---|---|---|---|---|
| 5,008,879 A | * | 4/1991 | Fischer et al. | ............... 370/401 |
| 6,269,252 B1 | * | 7/2001 | Hutchings et al. | ........ 455/552.1 |
| 6,892,230 B1 | * | 5/2005 | Gu et al. | ...................... 709/220 |
| 7,076,552 B2 | * | 7/2006 | Mandato | ...................... 709/226 |
| 7,152,109 B2 | * | 12/2006 | Suorsa et al. | ............... 709/226 |

OTHER PUBLICATIONS

Department of Defense-C4ISR-Architecture Working Group, *Levels of Information Systems Interoperability (LISI)*, Mar. 30, 1998.

* cited by examiner

*Primary Examiner*—William Trost, IV
*Assistant Examiner*—Toan D Nguyen
(74) *Attorney, Agent, or Firm*—Yee & Associates, P.C.; Baldwin D. Quan

(57) ABSTRACT

A new approach to creating network-centric systems such as those used in warfare and for other purposes is provided. One technique for providing a collaborative capability that achieves a high level of asset utilization includes the steps of specifying a role for each node in a system, assigning a pre-defined functionality level to each node as a function of the node's role in the system, and allowing each node to share information with other nodes in the system according to each node's capabilities using the assigned functionality level. Data sharing and collaboration between nodes having different assigned functionality levels may be facilitated by adjusting the functionality level for at least one of the nodes such that both are able to communicate at the same level. The adjustment in functionality may take place directly between the nodes, or may be processed by a gateway or other intervening system.

7 Claims, 7 Drawing Sheets

| | Level | Interoperability Capability | | Semantic | Process | Application | Digital Infrastructure | End-to-End QoS |
|---|---|---|---|---|---|---|---|---|
| 110 | 5 | Virtual Associate | a Agent | | | | DAML | |
| 108 | 4 | Coordination | c Resource Management | | | | SNMP, MIB | |
| | | | b Plan/Task | Ontology | | | RDFS | |
| | | | a Workflow | Interference Rules | | | Inference Engine, Process Engine | |
| 106 | 3 | Contribution | b Utility Computing | | | | OGSA | Priority Processing |
| | | | a Web Services | | | | WSI | |
| 104 | 2 | Interaction | e Dissemination | | Exception Rules | | Pub/Sub | Persisted Queue, Queue Priority |
| | | | d Transaction | Self-described Data Structure | Digital Signature | | Request Response | Two-Phase Commit |
| | | | c Download Apps | | | Applets | JVM | |
| | | | b Web Enabled | | | Browser | HTTP | Reliable HTTP |
| | | | a Remote Execution | | | | CORBA | |
| 102 | 1 | Communication | e Voice, Video | MPEG | | H.323 | DiffServ, IntServ, RSVP | Reservation |
| | | | d Messaging with Attachments | TIFF, JPEG | | | MIME | |
| | | | c Basic Messaging | TEXT, BINARY | | Email | SMTP | Receipt ACK |
| | | | b Transfer files | TEXT | User Authentification Encryption | FTP | TCP/IP, DNS | |
| | | | a Ping/Packets | IP PACKET | | Ping, Trace | IP Network | IP Best Effort |

Columns: 112, 114, 116, 118, 120, 122; Figure 100

| Level | Interoperability Capability | | | Semantic | Process | Application | Digital Infrastructure | End-to-End QoS |
|---|---|---|---|---|---|---|---|---|
| 5 | Virtual Associate | a | Agent | | | | DAML | |
| 4 | Coordination | c | Resource Management | | | | SNMP, MIB | |
| 4 | Coordination | b | Plan/Task | Ontology | | | RDFS | |
| 4 | Coordination | a | Workflow | Interference Rules | | | Inference Engine, Process Engine | |
| 3 | Contribution | b | Utility Computing | | | | OGSA | Priority Processing |
| 3 | Contribution | a | Web Services | | | | WSI | |
| 2 | Interaction | e | Dissemination | | Exception Rules | | Pub/Sub | Persisted Queue, Queue Priority |
| 2 | Interaction | d | Transaction | Self-described Data Structure | Digital Signature | | Request Response | Two-Phase Commit |
| 2 | Interaction | c | Download Apps | | | Applets | JVM | |
| 2 | Interaction | b | Web Enabled | | | Browser | HTTP | Reliable HTTP |
| 2 | Interaction | a | Remote Execution | | | | CORBA | |
| 1 | Communication | e | Voice, Video | MPEG | | H.323 | DiffServ, IntServ, RSVP | Reservation |
| 1 | Communication | d | Messaging with Attachments | TIFF, JPEG | | | MIME | |
| 1 | Communication | c | Basic Messaging | TEXT, BINARY | | Email | SMTP | Receipt ACK |
| 1 | Communication | b | Transfer files | TEXT | User Authentication Encryption | FTP | TCP/IP, DNS | |
| 1 | Communication | a | Ping/Packets | IP PACKET | | Ping, Trace | IP Network | IP Best Effort |

FIG. 1

SYSTEMS AND METHODS FOR PROVIDING COLLABORATION BETWEEN SYSTEMS

TECHNICAL FIELD

The present invention generally relates to information sharing, and more particularly relates to systems and techniques for forming ad-hoc systems of inter-operating nodes.

BACKGROUND

As computing systems continue to permeate every aspect of personal and professional life, the need for systems and standards that allow computers to interoperate is significant. Computing devices are commonly found in vehicles, homes, offices, aircraft and the like, yet most of these systems are unable to interoperate with other computing systems to achieve common goals. In a battlefield setting, for example, the benefits of a wide network of interoperating systems are significant, yet very difficult to achieve in practice. Accordingly, the ability for computers to work together to achieve a common purpose or task is frequently impeded by the lack of interoperability standards and systems.

Modern warfare, for example, could benefit greatly from increased interoperability between systems on and above the battlefield. After the end of the Cold War and the advent of the Information Age, modern warfare strategies no longer focus on merely inflicting damage upon a particular enemy, but rather emphasize capabilities to shape behaviors of friends, foes and neutrals in peace, crisis and war settings. Whereas previous strategies generally focused upon countering defined combat threats, modern "effects based" operations provide a broad range of options for responding to a variety of challenges. Effects based operations (EBO) typically rely heavily upon the ability of combatants and strategists to rapidly share information about battlefield conditions, command intent and the like. Lethality, survivability and responsiveness are all improved through rapid information sharing and improved situation awareness, thereby resulting in increased combat power. Similar benefits may be achieved from improving system interoperability in other settings, such as in the home, workplace, community or the like.

Effects-based operations benefit greatly from the ability of geographically separated entities to quickly and efficiently share information, to collaborate on tasks, and to synchronize actions in a network-centric environment. In particular, network-centric (i.e. information based) operations (NCO) benefit from flexible coordination of available resources to form dynamic, ad-hoc networks suitable for a particular mission or operation. It may be desirable, for example, for a soldier operating on a battlefield to obtain real-time photographs or other data from a satellite or aircraft passing overhead during an operation. Such timely and accurate data may greatly reduce the risks and increase the effectiveness of the soldier's operation, yet this information is typically not presently available due to technology limitations.

In practice, truly network-centric operations have been hampered by multiple barriers to system interoperability. Although many electronic systems are already present on the modern battlefield, for example, there are currently no data standards, protocols, data models or ontology for allowing such systems to share information with each other. Moreover, platform limitations in terms of processing power, memory, bandwidth, cost, size, power availability and the like have prohibited adoption of a common data sharing model, since no single standard has emerged that is able to simultaneously exploit the abilities of the most capable systems while retaining compatibility with the least capable systems. As a result, systems are frequently either under-designed (e.g. by placing excessive demands upon low-capability systems) or over-designed (e.g. by failing to exploit available power of high-capability systems).

It is therefore desirable to create a new approach for creating network-centric environments, particularly in the battlefield setting. It is also desirable to create systems and methods for providing interoperability between systems of varying capabilities to establish dynamic, ad-hoc "islands of capability". Furthermore, other desirable features and characteristics of the present invention will become apparent from the subsequent detailed description and the appended claims, taken in conjunction with the accompanying drawings and this background of the invention.

BRIEF SUMMARY

A new approach to creating network-centric systems such as those used for warfare and for other purposes is provided. According to various embodiments, a collaborative capability that achieves a high level of asset utilization is provided by specifying a role for each node in a system, assigning a pre-defined functionality level and interface designation to each node as a function of the node's role in the system, and allowing each node to share information with other nodes in the system according to each node's capabilities using the assigned functionality level. Data sharing between nodes having different assigned functionality levels may be facilitated by adjusting the functionality level for at least one of the nodes such that both are able to communicate at the same level. The adjustment in functionality may take place directly between the nodes, or may be processed by a gateway, registry and/or other intervening system.

BRIEF DESCRIPTION OF THE DRAWINGS

The present invention will hereinafter be described in conjunction with the following drawing figures, wherein like numerals denote like elements, and FIG. 1 is a layout view of an exemplary data framework for a multi-layer reference model;

DETAILED DESCRIPTION

Figure 2:
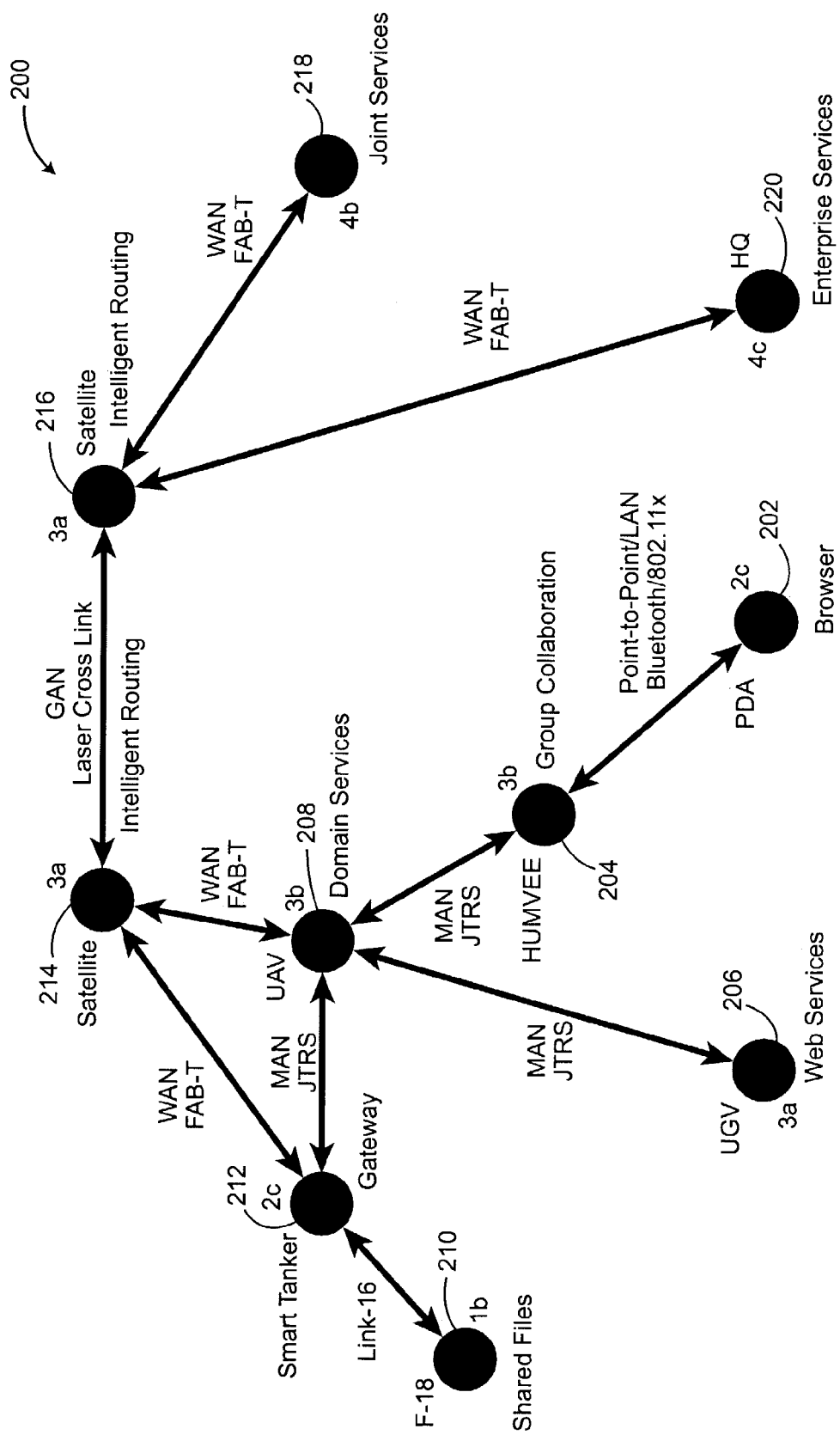
FIG. 2 is an interoperability map of an exemplary ad-hoc network.

The following detailed description is exemplary in nature and is not intended to limit the invention or the application and uses of the invention. Furthermore, there is no intention to be bound by any theory presented in the preceding background of the invention or the following detailed description.

According to various exemplary embodiments, a reference framework is provided that defines various discrete levels of interoperability for nodes used in a network centric operation. Each level is defined with particular standards for level of security, quality of service, available functionality and the like. To create a system for sharing information in a network centric operation (NCO), various scenarios are determined, and assets needed for each scenario are identified and functionality/capability assigned to each asset. After obtaining measures of effectiveness (MOE) and key performance parameters (KPPs), each asset can be assigned a level of interoperability from the reference model based upon the node's assigned functionality/capability. Using the node's intrinsic level of interoperability and the common reference framework, the various nodes can be developed such that each node is able to interoperate with other nodes in the network. In a further embodiment, higher levels of interoperability are designed such that they are inclusive of lower levels, thereby allowing nodes with higher intrinsic levels of interoperability to communicate at a lower level. Because each node can be built to its intrinsic level of interoperability that is correlated to the node's function, the problems of over- and under-design are substantially reduced, while allowing each node in the network to interoperate at a "highest common denominator" level with other nodes.

As used herein, the term "node" is intended to broadly encompass any system, device, process or other computing hardware and/or software entity that is capable of providing or receiving data in an information-sharing and/or data network environment. Such an environment may include physical "hard-wired" networks such as the internet, public and/or private data communications networks as well as wireless links (e.g. RF, optical, cellular, satellite or other wireless links) or networks as appropriate. Indeed, an exemplary network centric operation may make simultaneous use of hard-wired and wireless links interconnecting multiple aircraft, ground units, command centers, satellites and the like, as described more fully below.

With reference now to FIG. 1, an interoperability framework 100 for an exemplary reference model suitably includes a number of levels 102, 104, 106, 108 and 110 corresponding to various levels of interoperability for nodes communicating via an information-sharing network. In the exemplary framework 100 shown in FIG. 1, five levels of interoperability corresponding to communication 102, interaction 104, contribution 106, coordination 108 and virtual associate 110 are shown, although alternate embodiments may contain any number of interoperability levels. Each level may include any number of sub-levels, as denoted by lower-case letters in FIG. 1. Interoperability level three in FIG. 1, for example, defines a level of interoperability 106 that supports contribution of data to other nodes via web services (i.e. "level 3a") and/or utility computing (i.e. "level 3b"). Each interoperability level may be sub-divided in any manner, or may not be sub-divided at all (e.g. interoperability level five, virtual associate 110 in FIG. 1).

Framework 100 suitably defines the attributes, standards, protocols and/or the like for supporting interoperability at each of the various levels. In the exemplary framework 100 shown in FIG. 1, the various interoperability levels are defined with regard to semantics 114, process 116, applications 118, digital infrastructure 120, and end-to-end quality of service (QoS) 122. Each of these defining constraints are discussed in additional detail below. As briefly mentioned above, each level and sub-level may incorporate the functionalities of some or all of the lower levels in framework 100. Nodes functioning at level 2a, for example, appropriately encompass the abilities of lower communications levels 102 (e.g. levels 1a-e) such that the node operating at a higher level could interoperate with a lower level node at the lower node's intrinsic level, as described more fully below.

Communication level 102 suitably defines techniques for implementing basic data communication activities such as acknowledging existence (e.g. "ping"), exchanging messages (e.g. email), and the like. At a most basic level (shown as level 1a in FIG. 1), an acknowledgement scheme is defined whereby a device responds to a "ping" or "trace" request provided over an internet protocol (IP) network using conventional IP packet routing and "best effort" delivery. Higher interoperability levels incorporate user authentication (e.g. userid/password combinations) and/or encryption (e.g. symmetric and/or asymmetric cryptography) to improve security, as well as receipt acknowledgment and/or bandwidth reservation techniques to improve end-to-end reliability. Other communications level 102 services that may be provided in various embodiments include file transfer using file transfer protocol (FTP) or other techniques ("level 1b"), basic messaging using simple mail transport protocol (SMTP) email or the like ("level 1c"), messaging with binary file attachments using, for example, multipurpose internet mail extensions (MIME) ("level 1d") and/or transmission of digital voice, video or other multimedia content using H0.323 teleconferencing protocol or the like ("level 1e").

Interaction level 104 suitably defines techniques for implementing interactive capabilities such as information sharing, digital transactions and the like. Interactive operations may incorporate conventional world wide web (W3 or WWW) functionality, for example, and/or may be based upon other technologies including open or proprietary protocols. In the exemplary framework shown in FIG. 1, basic interactions include remote execution of applications ("level 2a") using common object request broker architecture (CORBA) constructs or the like, as well as web enabled transactions ("level 2b") using conventional hypertext transport protocol (HTTP) and any conventional HTTP browser. More advanced interactions may be defined to include downloading of applications or "applets" ("level 2c") using ActiveX, NET, JAVA, or the like, processing an interactive transaction ("level 2d"), and/or disseminating data ("level 2e") using conventional publish-and-subscribe techniques.

Contribution level 106 suitably defines techniques for contributing to another node's effectiveness through performing various services and/or lending resources on the node's behalf. Various web-enabled services ("level 3a") may be implemented using conventional web services infrastructure (WSI) or simple object access protocol (SOAP) constructs. Similarly, various utility computing ("level 3b") applications may be readily implemented using open services grid architecture (OSGA) or other constructs.

Coordination layer 108 suitably defines techniques for coordinating node activities through workflow ("level 4a"), planning and tasking ("level 4b"), and/or resource management ("level 4c") as appropriate. Exemplary technologies that may be used to implement coordination layer 108 services include simple network management protocol (SNMP) and/or management information base (MIB) technologies, as well as resource description framework schema (RDFS) technologies or the like.

Virtual associate level 110 suitably defines techniques for acting as an agent to represent another node's interests. Examples of virtual associates (level 5) include applets, "'bots" or other applications that perform transactions or electronic negotiations on behalf of operators or other nodes. Exemplary technologies that may be used to implement various exemplary virtual agents include the Defense Advanced Research Projects Agency (DARPA) agent markup language (DAML), the ontology information language (OIL) and the like.

In the exemplary embodiment shown in FIG. 1, each level of framework 100 is defined in terms of semantics 114, process 116, application 118, digital infrastructure 120 and end-to-end quality of service 122. Alternate frameworks 100 could also be formulated with additional, fewer or differing constraints, as appropriate for the particular setting and environment.

Semantic definition 114 suitably specifies the structures used to extract meaning from data transmitted between nodes. The lowest levels may pass data in simple packet formats, for example, or in relatively simple ASCII or binary formats. More advanced semantic definitions include particular file types (e.g. MPEG, JPEG, TIFF), as well as self-defined data structures that include metadata, extensible markup language (XML) tags or other information fields within transmitted data that describe the data itself. Still more advanced semantic definitions may make use of inference rules and/or various ontology techniques. Semantic constraints 114 may be used to define registries (e.g. databases) that maintain information about the various operating environments. Registries may be established to specify ontologies for operating environments like command and control, maintenance, training, logistics, weapon systems and the like.

Process definition 116 suitably specifies processes and procedures to support interoperability for the various functionality levels. Exemplary processes may include processes for supporting interoperability (e.g. routines for registering nodes in a region or domain directory service). Other processes may include rules for processing exceptions (e.g. recovery procedures following a node failure) and the like. Still further processes that may be defined for some or all levels include security procedures such as cryptography routines, authentication techniques, routines for interacting with a certificate authority (CA) or other trusted authority, and the like.

Application definition 118 suitably specifies application programs, applets, objects or other executable routines for generating and/or consuming information. Defined applications act as endpoints for data flows between nodes, and are specified for the particular interoperability capabilities of each level/sub-level. Various applications may provide services for the node, may support domain specific functions as discussed below, and/or may collaborate or synchronize with counterpart applications on other nodes.

Infrastructure definition 120 suitably specifies the various technologies that transport data packets between nodes, convert data packets into information, manage and process information, and/or provide services to applications executing on the node. In an exemplary embodiment, infrastructure components may be based upon the TCP/IP protocol stack for networking and XML or other standards for information structure. In an exemplary embodiment, physical infrastructure may be assumed to be present such that the node is able to communicate with an existing TCP/IP network, although other embodiments may define physical connections as well.

Quality-of-service definition 120 suitably specifies acceptable levels of performance with respect to end-to-end data transmissions for each interoperability level. Such functionality may be defined based upon key performance parameters (e.g. packet drop rate of less than any threshold level, such as about 0.05%), or may be based upon objective standards or the like. Nodes disseminating information, for example, may have the capability to prioritize processing of queued messages, whereas router nodes may implement standards relating to packet priority or the like.

Accordingly, framework 100 includes a set of standards and specifications for designing and implementing information-sharing nodes at varying levels of interoperability. With a defined framework 100 of interoperability levels, nodes can be readily fashioned to operate at an intrinsic level that is the highest level of capability for the node to interoperate with other nodes in a networked environment. Sensing nodes with primary purpose of gathering information, for example, may operate at relatively low levels (e.g. on the order of about level 2$b$ and below), while cognitive "decision making" nodes may operate at relatively higher levels (e.g. on the order of about level 2$b$ and above). Effector nodes that execute the decisions made by cognitive nodes may be designed to operate at intermediate levels (e.g. on the order of about level 2$a$ to about level 3$a$). Various node functionalities can therefore be correlated to one or more levels and/or sub-levels in framework 100, which in turn provide a set of guidelines for implementing nodes that are capable of executing desired tasks.

The particular embodiment of framework 100 shown in FIG. 1 is presented by way of example, and is not intended to be restrictive. Many equivalent alternate embodiments of framework 100 could be created that include different types or numbers of defining constraints for the various levels, and the particular technologies, protocols and the like that are specified for each level and sub-level may vary widely from embodiment to embodiment. Further, the particular labels for each level and sub-level are provided for convenience and ease of illustration, but should not be considered as limiting in scope.

By designing multiple nodes to conform to an overall interoperability framework 100, interoperability is fostered even when the various nodes have widely varying processing and communication capabilities. This interoperability between different types of nodes allows the formation of ad hoc networks to execute a particular task or tasks, as appropriate. With reference now to FIG. 2, an exemplary environment 200 suitable for use in a network centric operation includes multiple nodes designed to various interoperability levels forming an ad hoc networked group-of-capability. In the network shown in FIG. 2, two or more satellite nodes 214, 216 having an intrinsic capability of about level 3$a$ are designed to communicate with ground and air-based nodes using FAB-T or other wireless links to implement a wide area network (WAN). Satellites 214, 216 suitably interlink ground-based nodes (e.g. headquarters node 220) and airborne nodes such as a joint services command node 218, gateway node 212 (shown residing in a smart tanker or other aircraft) and domain services node 208 (shown residing in an unmanned aerial vehicle (UAV)). Satellites 214, 216 may also provide an intelligent routing function to route digital information between the various nodes communicating within environment 200.

An illustrative example will demonstrate the benefits of a system designed according to a reference model framework 100 (FIG. 1). With continued reference to FIG. 2, a mission commander on an airborne command and control aircraft such as an Air Force MC2A aircraft may become aware of a time-critical target to be engaged with existing assets that are currently on other missions. As assets (nodes) in the area have "reported in" to a common domain registry with information regarding their identity, interoperability capability, mission capability, current mission assignment, location and/or the like, the commander is appropriately made aware of each node's location, its capability, and its current mission assignment. One such registry may be provided by domain services node 208 (level 3$b$), which is shown located in an unmanned aerial vehicle (UAV) in the embodiment shown in FIG. 2, although registries may be located in other terrestrial and/or ground-based locations in other embodiments. Domain services node 208 suitably maintains a registry, database or other record of each node that is operating within the area or domain. In the exemplary embodiment of FIG. 2, domain services node 208 is shown in communication with at least one vehicle node 204 (level 3b), an unmanned ground vehicle (UGV) node 206 (level 3a) and a gateway node 212 (level 2c) on a refueling aircraft via a joint tactical radio system (JTRS) or other appropriate communications link.

A decision aid tool available to the commander on airborne command node 218 (level 4b) suggests that an Army unit with a UGV be tasked to engage the nearby target based upon the UGV's location and capabilities. The UGV may be controlled by a soldier having a personal digital assistant (PDA) node 202 (level 2c) that is used to remotely control UGV node 206 (level 3a) as appropriate, and that communicates with a group collaboration node 204 (level 3b) residing in a vehicle or other appropriate location. The commander's node (operating at level 4b) may provide certain information to the soldier's PDA using only constructs that are available to the PDA (i.e. level 2c). The information may be sent using conventional web constructs, for example, or using any other appropriate technique. PDA node 202 may also obtain additional data from sensors attached to UGV node 206. Because PDA node 202 (level 2c) operates at a lower level of interoperability than UGV node 206 (level 3a), interoperability between the two may be limited to the highest common denominator between the two nodes (i.e. level 2c). Image data may be transferred from a web-type server applet executing on UGV node 206 to a browser application executing on PDA 202, for example, using domain services node 208 to transfer the data as appropriate.

If information received from command node 218 fails to match sensor data from UGV node 206, the soldier may wish to obtain additional information before engaging the target. The speed at which this information becomes available to the soldier may be very important, since the target may be mobile and may pose a threat to civilians, forces friendly to the soldier, or others during the intervening time. Accordingly, software on PDA node 202 accesses a list of resources available in the area from domain services node 208 and subscribes to data and/or services provided by appropriate resources. The service directory provided by domain services node 208 suitably functions as a "yellow pages" type service whereby nodes in the domain can advertise their resources and capabilities. In this example, the service directory identifies an aircraft node 210 (e.g. a Navy F-18 or the like) in the area on a separate mission, but having the capability to provide aerial photographs. If the aircraft node 210 is not capable of communicating on a TCP/IP or other appropriate network interconnecting the various nodes in environment 200, a gateway node 212 may be provided to transfer data communications from environment 200 to the aircraft node 210. A gateway node 212 may be provided on a refueling aircraft, for example, of from any other convenient source, to act as a proxy for node 210 operating in environment 200. In the exemplary embodiment shown in FIG. 2, aircraft node 210 is capable of communicating via a LINK-16 network to gateway node 212, which appropriately converts data from the LINK-16 format to TCP/IP or other protocols that can be transferred within environment 200. Accordingly, gateways to environment 200 suitably allow legacy and other nodes to communicate with nodes in environment 200 even if the legacy nodes do not include implementations of the common interoperability framework.

After environment 200 identifies a source of data for PDA node 202, a request to fuse the new data from aircraft node 210 and UGV node 206 may be provided to a data fusion service provided by command and control node 218, for example, or by any other source. The fused data may then be provided to PDA node 202 to verify the target's identity and/or location, and may also be provided to UGV node 206 to improve its ability to locate the target.

While the foregoing example is exemplary in nature, it illustrates several benefits of a common interoperability model framework 100. First, nodes having different interoperability capabilities are allowed to inter-communicate using a highest common denominator that is defined by the reference model. This capability allows ad-hoc networked groups-of-capability to be created "on the fly" to accomplish particular tasks. The scenario described above was made possible by the inter-coordination of several nodes, some of which were not "aware" of their involvement in the event. UAV node 208, for example, functioned as a router for data packets and provided a local platform for service directory and information dissemination even though the UAV itself may have been on a separate mission, and even though the various nodes within the domain have widely varying missions and capabilities. By making use of available assets, framework 100 enables ad hoc "groups of capability" to be readily formed through collaboration of relevant assets to achieve a mission objective. Again, the particularly networks, nodes, arrangements, missions, communications links and the like that are shown in FIG. 2 and discussed above are merely exemplary in nature, and should not be construed as limiting the scope of the invention in any way. Indeed, any number of equivalent variations could be formulated to achieve any mission or objective in a battlefield setting or elsewhere. Nevertheless, the systems view shown in FIG. 2 illustrates the capabilities available from a common interoperability framework.

Figure 3:
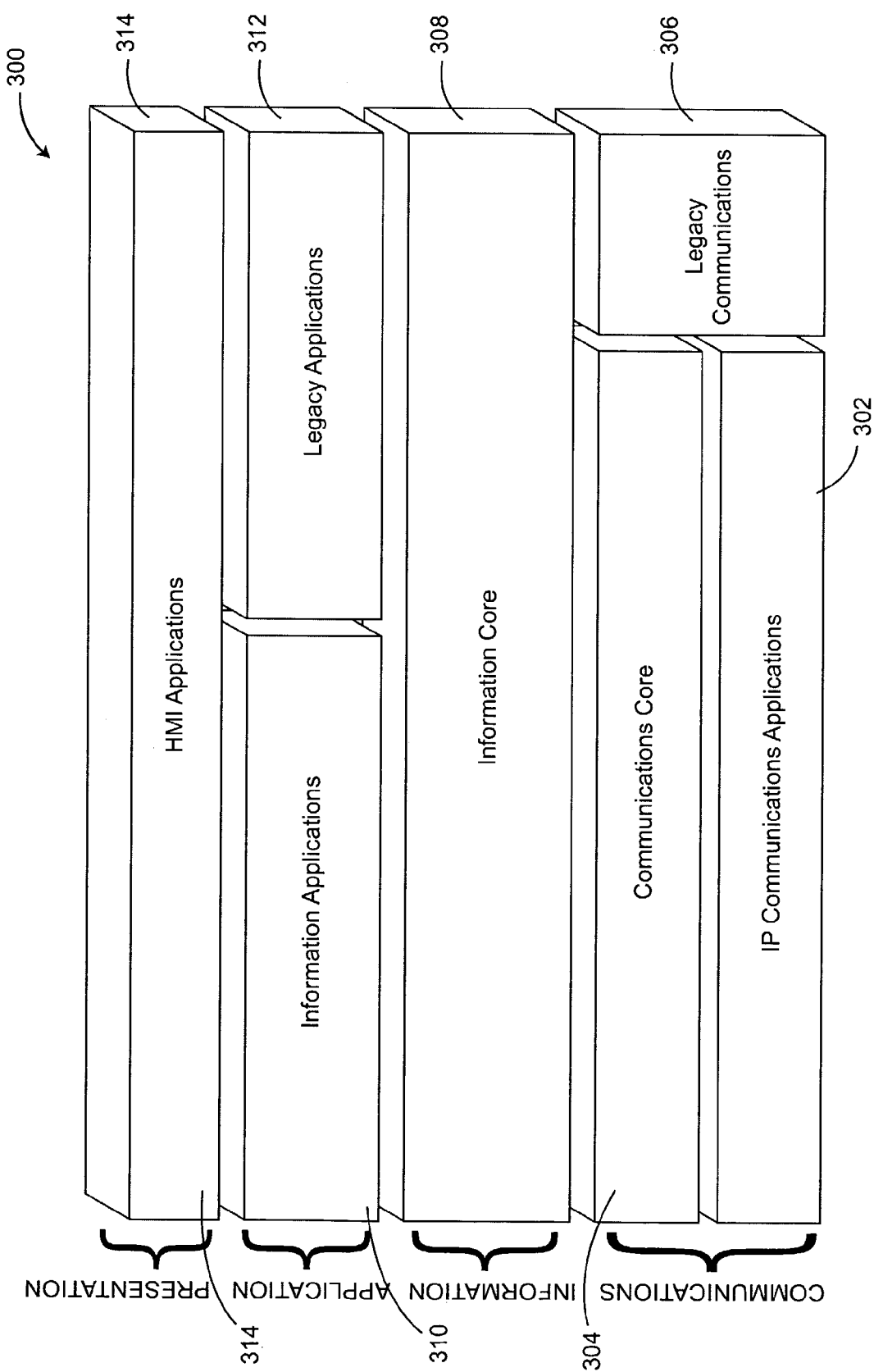
FIG. 3 is a block diagram of an exemplary common architecture framework.

As briefly mentioned above, nodes are constructed according to a common architecture framework that allows the various levels of interoperability to build upon each other such that relatively high-functioning nodes incorporate the capabilities to communicate with lower-functioning nodes. With reference now to FIG. 3, an exemplary common architecture framework 300 for a computing node suitably includes modules for providing communications, information, application and presentation capabilities as appropriate. Each of these various modules may be defined by the common interoperability framework 100 (FIG. 1) such that interoperable nodes may be readily created. Node users suitably interface with the node using a human-machine interface (HMI) application 314, as appropriate. Examples of HMI applications include conventional browser programs, as well as other programs capable of presenting information to the user via a graphical or other user interface. HMI applications may also accept inputs from the user using a keyboard, mouse, touchpad, voice recognition, or other input technology.

Presentation-level applications 314 suitably obtain data to display from information applications 310 and/or legacy applications 312. Information applications 310 are any programs that perform any sort of calculation, analysis or other processing of information from information core 308. Legacy applications 312 may also be present to ensure backward compatibility or to maintain access to legacy software code developed for prior versions of the node. Information core 308 is any database, repository or other data store that is capable of obtaining, storing and/or organizing data used by information applications 310 and legacy applications 312, as described more fully below. Information is transported to and from the node using communications layer modules 302, 304 or legacy communications module 306.

Figure 4:
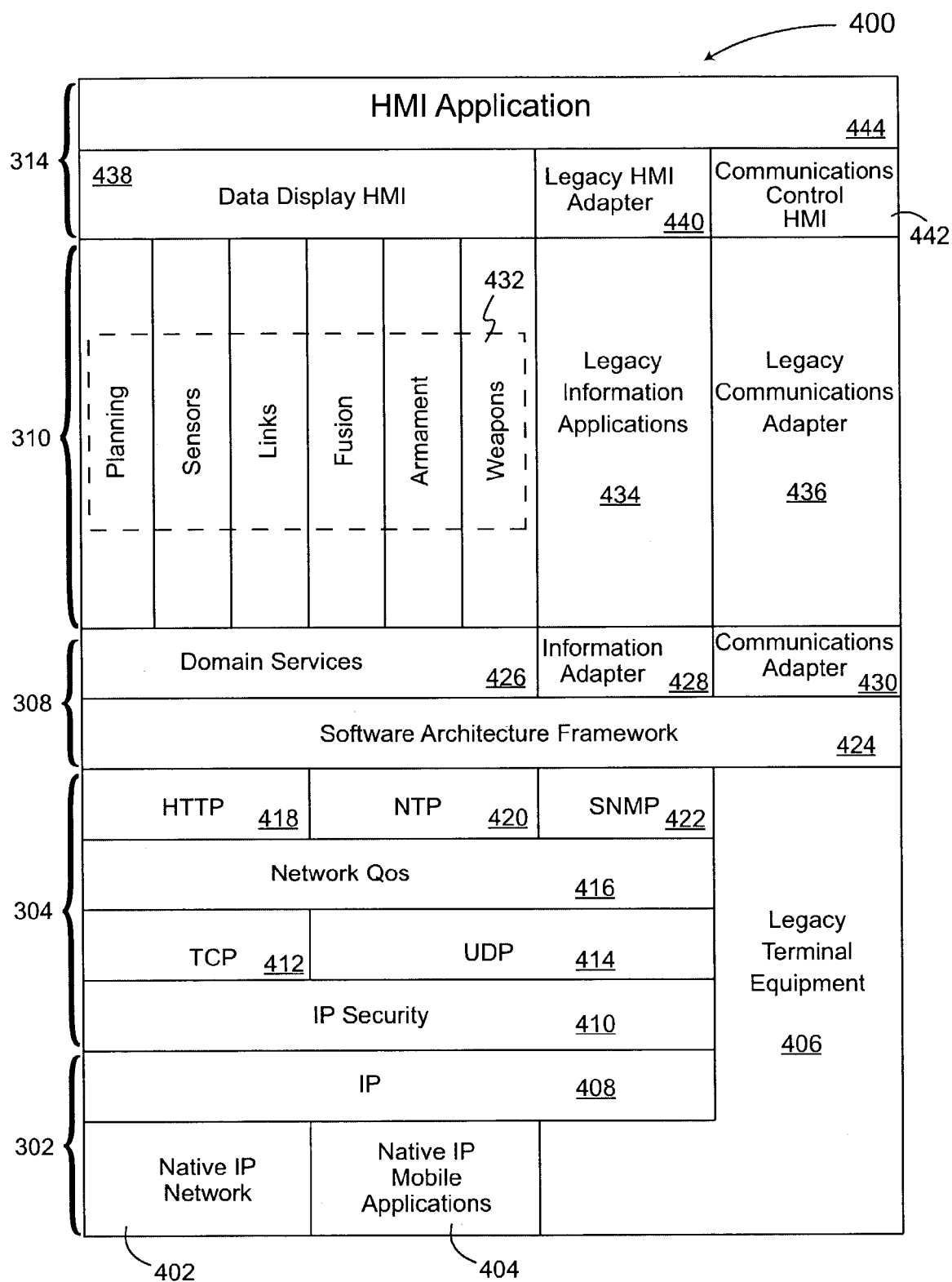
FIG. 4 is a block diagram of an exemplary architecture reference model implementation for a node.

FIG. 4 is a block diagram of an architecture reference model implementation for an exemplary node. With reference now to FIG. 4, an exemplary node 400 suitably includes various computing modules to implement the common architecture framework shown in FIG. 3 for a particular interoperability level that is selected in accordance with the node's role in the NCO. Communications layer 302 is appropriately provided by conventional IP network interface 402 and/or a wireless interface 404 such as a BLUETOOTH, IEEE 802.11 or other interface. Alternatively, node 400 may communicate using legacy terminal equipment 406 as appropriate. Communication core capability 304 is appropriately provided by any combination of protocol implementations such as IP module 408, transmission control protocol (TCP) module 412, user datagram protocol (UDP) module 414, hypertext transport protocol (HTTP) module 418, network time protocol (NTP) module 420, SNMP module 422, and the like. Security mechanisms 410 and quality-of-service module 416 may also be provided. Information core functionality 308 is provided by any conventional software architecture framework 424 that is capable of obtaining and processing data for the particular node hardware, and that is capable of providing proper interfacing 428, 430 to legacy and other information applications. Information obtained may be processed by domain service information 426. Accordingly, various applications 432 executing on node 400 may use domain registry information 426 to obtain additional data from remote sources as appropriate. Results from applications 432, as well as any legacy information obtained from legacy applications 434 and 436, are appropriately formatted and presented to the user.

Figure 5:
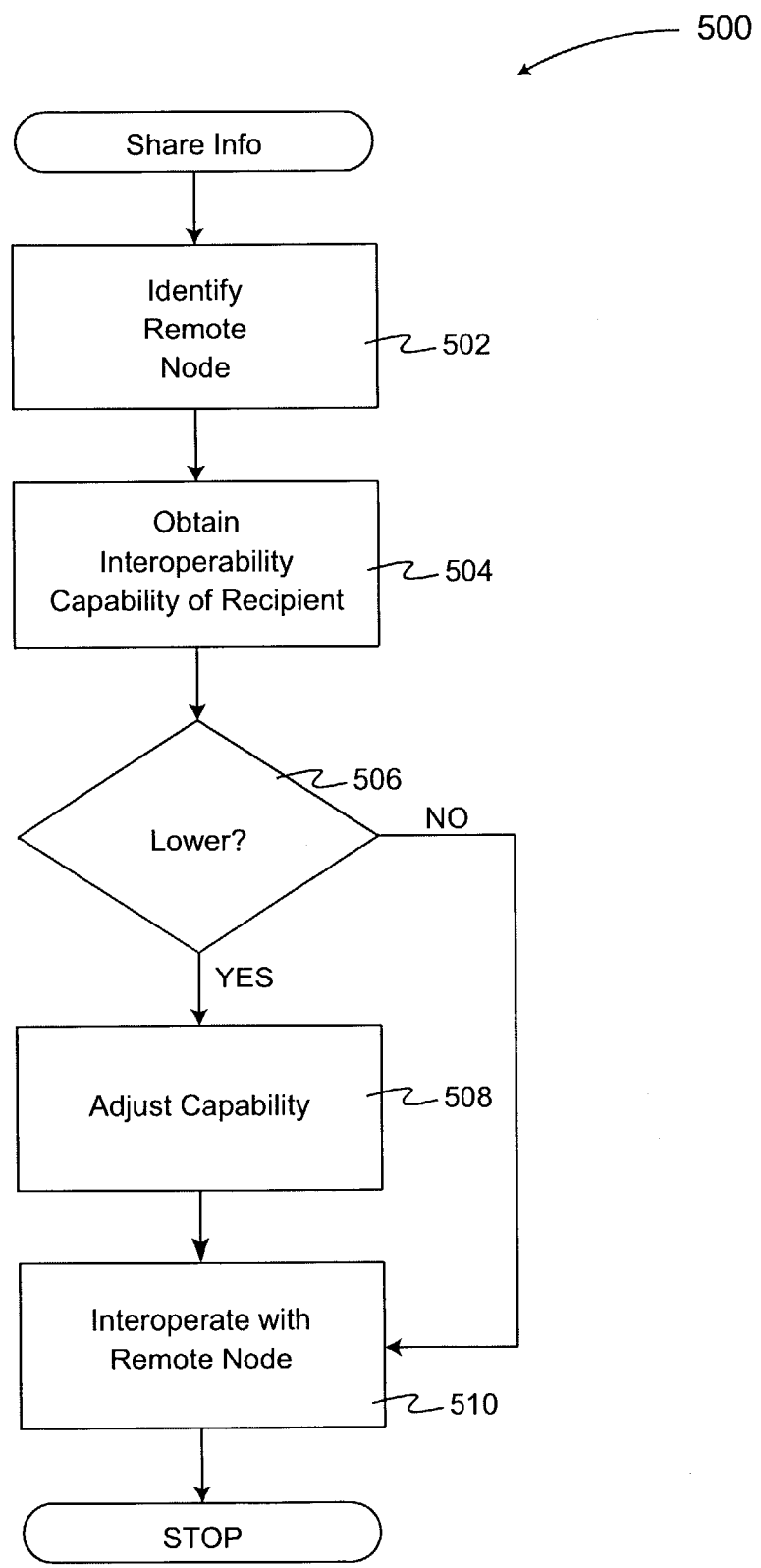
FIG. 5 is a flowchart of an exemplary process for sharing information between network nodes in an NCO environment.

In operation, the various nodes 400 suitably interoperate according to their assigned intrinsic interoperability levels. If two nodes having different intrinsic interoperability levels attempt to communicate, the node having the greater ability suitably communicates at a lower level. With reference to FIG. 5, an exemplary process 500 for sharing information between two nodes suitably includes the broad steps of identifying a destination node (step 502), identifying a capability of the remote node (step 504), and adjusting a communications capability of one of the nodes such that interaction between the nodes can take place (steps 506, 508, 510).

Process 500 suitably begins with a node identifying a destination node capable of providing a desired service or otherwise supporting a desired interaction (step 502). Remote nodes may be identified through any conventional practice, including manual entry of a uniform resource locator (URL) or other identifier from the user. Alternatively, the node may obtain the identity of a destination node by consulting a registry or other domain services database residing on a remote node. Such a registry may provide an identification of the destination node, a service provided by the node, a capability level indicator, and/or routing information for contacting the node. Accordingly, steps 502 and 504 in FIG. 5 may be combined into a single step in many embodiments.

Contacting the destination node may take place using any technique. In an exemplary embodiment, the sending node obtains routing information from the registry that allows the sending node to initiate an interaction. Routing of messages may take place using, for example, conventional TCP/IP routing protocols and techniques. Alternatively, a gateway node (e.g. node 212 in FIG. 2) may be contacted to act as a proxy for either the sending or receiving node, or to handle translation of data passing between the two nodes. Gateway nodes may be any nodes in the registry capable of converting and/or routing data between systems, networks or nodes. In such embodiments, certain nodes (e.g. legacy nodes) are allowed to interoperate within environment 200 (FIG. 2) via one or more gateways even if the nodes do not include implementations of the strategic architecture reference model (e.g. common architecture framework 300, FIG. 3). Gateway nodes provide proxy interactions on behalf of nodes operating in separate environments, such as nodes operating in the LINK-16 network shown in FIG. 2.

If the nodes are configured to communicate at different levels (step 506), the data from the higher functioning node is appropriately adjusted to be compatible with the lower-level node (step 508). Adjustment takes place through any appropriate technique. A gateway or other service may provide translation services, for example, that allow for communications between nodes of varying levels. Alternatively, high-level service nodes may process proxy transactions or other interactions on behalf of lower functioning nodes, thus eliminating the need for direct communication between the differently-abled sending and receiving nodes. In still other embodiments, the nodes directly negotiate a common level of interaction that is available to both nodes. In such embodiments, the higher-functioning node operates at a lower level using a common framework that is available to the lower-level node. After a common mode of communication is established, the nodes are able to interact as appropriate (step 510).

Figure 6:
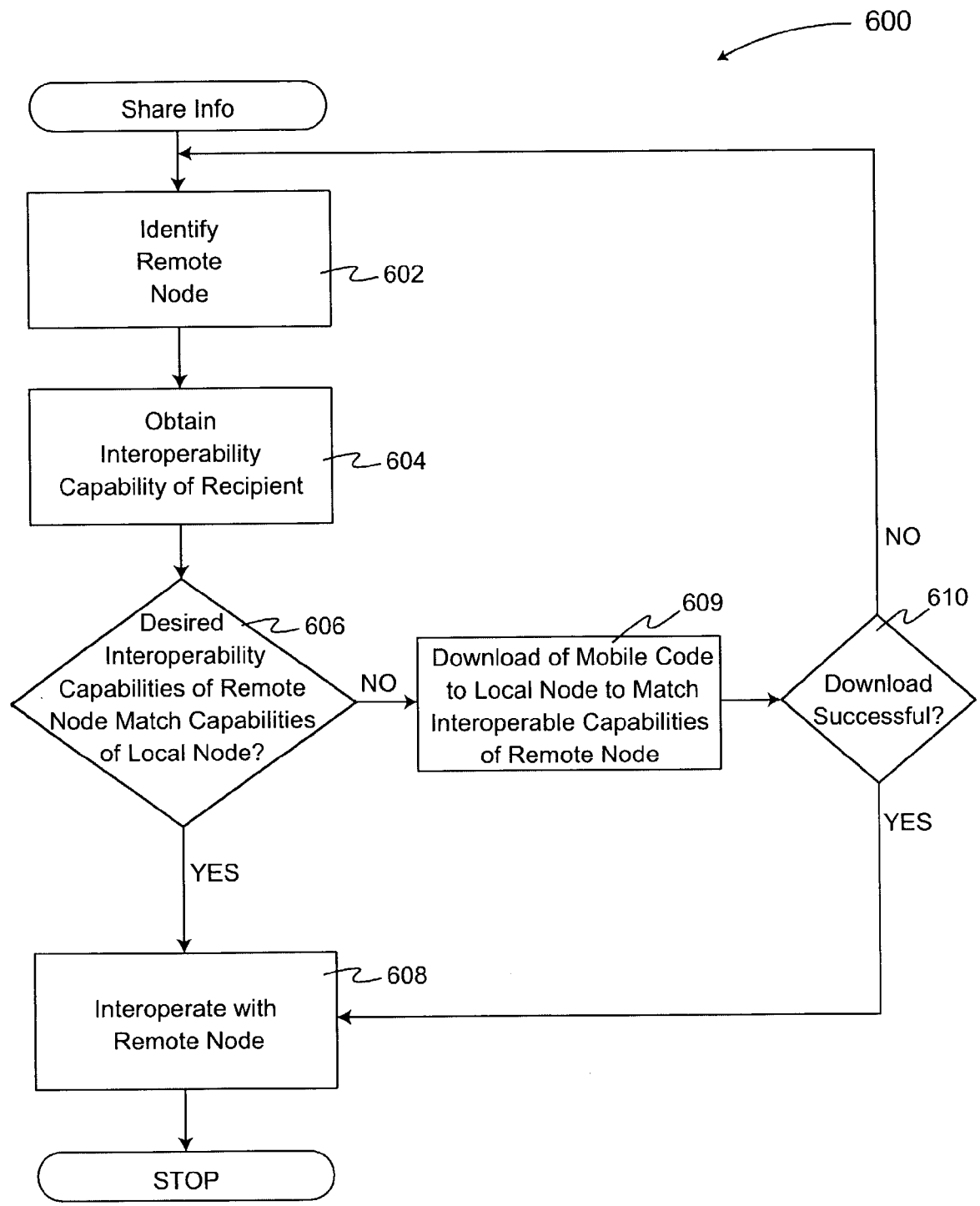
FIG. 6 is a flowchart of an exemplary process for adjusting interoperability capabilities.

Adjustment of communication levels may take place through any number of equivalent techniques, such as through the process shown in FIG. 6. Embedded systems (or other systems with limited processing and storage resources), for example, may not include full implementations the interoperability framework model, but rather include only a subset of the framework, such that the node is only able to interoperate with other nodes at a particular level. In such cases, a registry or other service may advertise the capabilities and/or limitations of the node, and/or may provide translation services to convert communications at other levels to a format that the node can process. Alternatively, certain nodes may use so-called "mobile-code" (such as plugins, applets or the like) to implement certain interoperability levels as needed. If such a node needs to communicate at a particular level for a particular task, the node may obtain a software implementation of the needed level from a server, registry or the like. The node uses the implementation as appropriate, and may then replace that implementation with an implementation of another level as needed for further tasks.

With reference now to FIG. 6, an exemplary information sharing process 600 that makes use of "mobile code" suitably begins with an initiating node identifying a remote node (step 602) and obtaining the remote node's interoperability capabilities (step 604) as described above. If the interoperability capabilities of the initiating node match those of the remote node (step 606), the nodes are able to interoperate (step 608) as appropriate. If the capabilities of the two nodes do not match (step 606), however, either or both nodes may obtain new interpretable or executable code to implement the desired functionality (step 609). Downloading the code may take place from any server, database or other source operating at any physical or logical location within environment 200 (FIG. 2) or elsewhere. If the download of mobile code is successful (step 610), the nodes interoperate as appropriate using the downloaded code (step 608). If either or both nodes are unable to obtain the desired code (step 610), however, the initiating node appropriately identifies another remote node (step 602) that is able to provide the desired service. Many other techniques for adjusting the levels of node interoperability could be formulated in various equivalent embodiments. Various implementations using converting gateways or other network services, for example, could be formulated to provide translation services between nodes operating at different interoperability levels.

Figure 7:
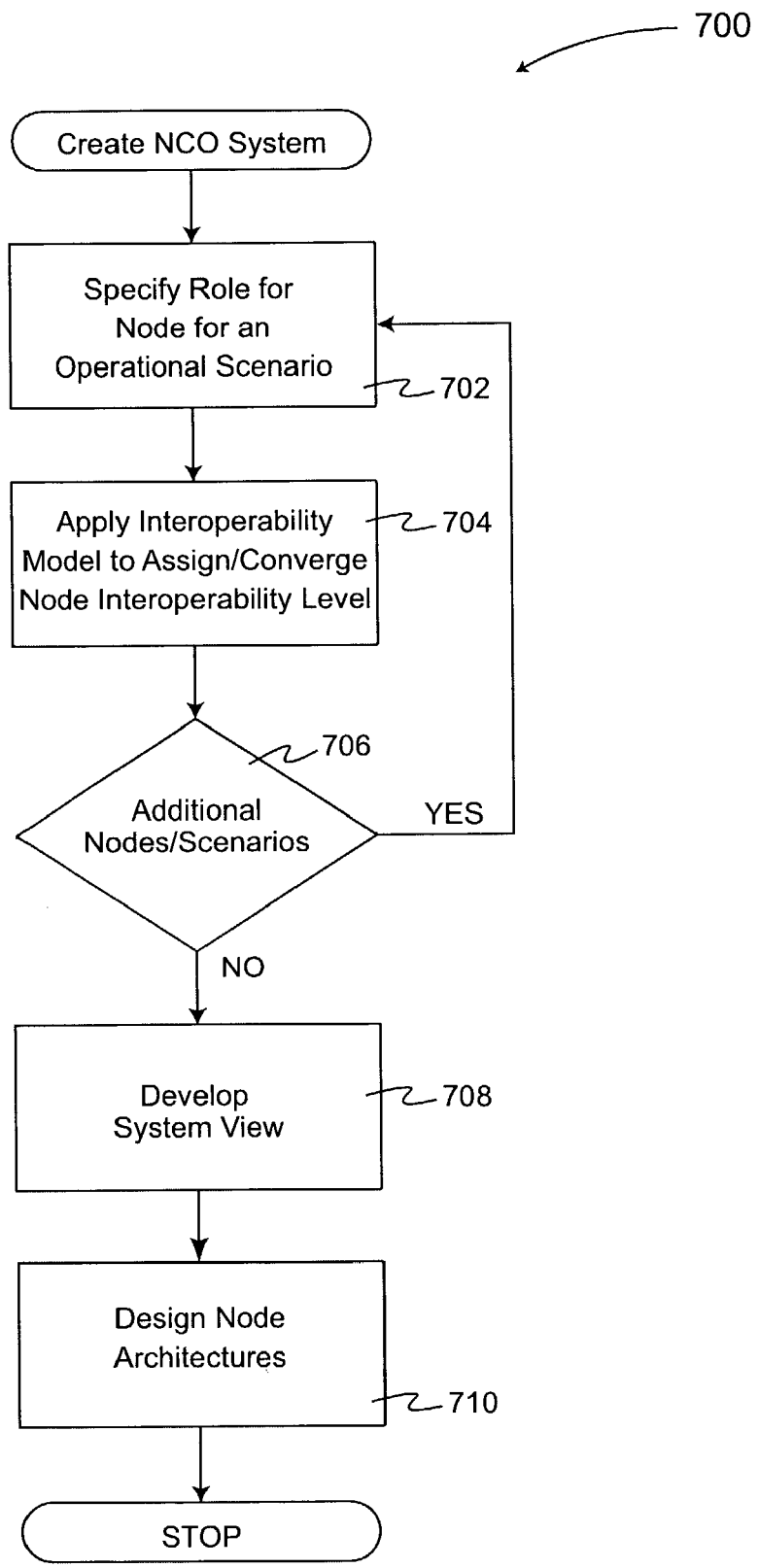
FIG. 7 is a flowchart of an exemplary process for creating NCO systems.

With final reference now to FIG. 7, an exemplary process 700 for creating a network-centric operations environment suitably includes the broad steps of specifying a role for each node in the system (step 702), applying a common data model to each node to determine a functionality level (step 704), developing a system view of the desired environment (step 708), and applying a common architecture framework to develop node architectures (step 710).

To specify a role for each node (step 702), key performance parameters (KPP) and measures of effectiveness (MOE) are obtained for given operational scenarios. KPP and MOE refer to any criterion, behaviors or other parameters for the nodes in the system, or for the performance of the overall system. These factors may be obtained through customer collaboration, experimental work, scientific research or the like. These MOEs and KPPs help determine the role of each node, which could be a sensor, an effector, a cognitive element, or any combination of these roles. A common interoperability framework 100 (FIG. 1) is applied to a node determine an intrinsic functionality level for the node that corresponds to the node's role in the system. If the node is expected to be an effector (i.e. to carry out tasks) and to publish or disseminate information to other nodes, for example, the node may have an intrinsic interoperability level of about level 2*e*, whereas a simple sensor application may function at about level 1*b* or so to simply transfer data to a server or other requesting node. Nodes with cognitive (e.g. decision support or decision making) roles may function at a higher level to provide workflow management, planning or tasking functions, and the like. This process may be repeated for multiple nodes operating within the system (step 706).

After the node has been assigned an intrinsic interoperability level, a system view is developed (step 708) to show the role of the node within the system and with respect to other nodes. An example of a system view is represented by FIG. 2, although of course other views could be obtained. The system view can be readily evaluated to achieve different roles or effectiveness for the node by repeating steps 702 and 704 as appropriate.

When the role of the node is finalized and mapped to an intrinsic interoperability level, the node architecture can be designed (step 710) using a strategic architecture reference model (SARM) such as reference model 300 shown in FIG. 3. The reference model specifies the various processing modules incorporated within the node for various levels of interoperability. Because the node functionality is mapped to a pre-determined functionality level in a common interoperability framework (FIG. 1) and because the functionality levels are defined in terms of semantics, process, application, infrastructure and/or quality of service, each node designed in compliance with the reference model are able to interoperate at a common defined level. Accordingly, each node is able to interoperate with each other node operating within the system. This ability enables the formation of ad hoc networks between widely diverse nodes in battlefield and other settings, which in turn allows for truly network centric operations to be performed.

While at least one exemplary embodiment has been presented in the foregoing detailed description, it should be appreciated that a vast number of variations exist. Although various aspects of the invention are frequently described in conjunction with a battlefield setting, for example, the various techniques and systems described herein could be readily implemented in other contexts, including emergency services, corporate or private data communications, or any other environment. It should also be appreciated that the exemplary embodiment or exemplary embodiments are only examples, and are not intended to limit the scope, applicability, or configuration of the invention in any way. The foregoing detailed description will provide those skilled in the art with a convenient road map for implementing the exemplary embodiment or exemplary embodiments. Various changes can be made in the function and arrangement of elements without departing from the scope of the invention as set forth in the appended claims and the legal equivalents thereof. The various steps of the methods, processes and techniques described in the appended claims, for example, could be practiced in any temporal order, for example, or may be practiced simultaneously in various equivalent embodiments.

What is claimed is:

1. A method of establishing communications between a first node and a second node in a system comprising a plurality of nodes, the method comprising steps of:

initiating an interaction between the first node and the second node, the interaction being determined by a request from the first node for a service that the second node provides in the system;

responsive to initiating the interaction, evaluating an interoperability capability configured for the first node and an interoperability capability configured for the second node;

negotiating, between the first node and the second node, based on the evaluating, to a level of interoperability capability that is available to both the first node and the second node, the negotiating being conducted directly by the first node and the second node; and responsive to the negotiating, automatically adjusting a level of communication within at least one of the first node and the second node to the available level of interoperability capability in performing the interaction between the first node and the second node.

2. An interoperability system comprising:

a plurality of communication nodes, wherein each communication node operates at a functionality level that includes an intrinsic functionality level selected from a plurality of pre-defined functionality level and sub-levels of functionality lower than the intrinsic functionality level; and a gateway node configured to obtain the functionality level of a sending node of the plurality of communication nodes and the functionality level of a receiving node of the plurality of communication nodes; enable a negotiation, between the sending node and the receiving node, to a communication level that is common between the obtained functionality levels of the sending node and the receiving node, wherein the sending node and the receiving node directly perform the negotiation; and, in response to an interaction initiated between the sending node and the receiving node, automatically adjust a level of communication within at least one of the sending node and the receiving node to perform the interaction.

3. The interoperability system of claim 2, further comprising a directory services node comprising a data base having a plurality of records, each record corresponding to one of the plurality of communication nodes and comprising an indication of the intrinsic functionality level of the node.

4. The interoperability system of claim 3, wherein the gateway node is further configured to obtain the intrinsic functionality levels corresponding to the sending node and receiving node from the directory services node.

5. A data processing system facilitating communications between a first node and a second node, the data processing system having a memory that includes executable program code comprising:

means for operating each node of a plurality of nodes in the system at a level of functionality that includes a level of functionality intrinsic to the node and all sub-levels of functionality lower than the intrinsic level of functionality;

means for identifying a destination node that is required to communicate with the first node to perform an operation within the system;

means for negotiating an appropriate level of functionality that is common between the destination node and the first node, the negotiating being conducted directly by the destination node and the first node, wherein the appropriate level of functionality is any level of functionality selected from one of the level of functionality for the destination node and the level of functionality for the first node; and responsive to the means for negotiating being used, means for automatically adjusting an operating level of functionality of the destination node and an operating level of functionality of the first node to the appropriate level of functionality in performing the operation within the system.

6. A method of communicating between nodes in a system having a plurality of nodes, the method comprising:

operating each node of the plurality of nodes in the system at a level of functionality that includes a level of functionality intrinsic to the node and all sub-levels of functionality lower than the intrinsic level of functionality;

identifying a destination node that is required to communicate with a first node to perform an operation that is requested within the system;

responsive to identifying the destination node, negotiating, between the destination node and the first node, to an appropriate level of functionality that is common to the destination node and the first node, the negotiating being performed directly by the destination node and the first node, wherein the appropriate level of functionality is any level of functionality, selected from one of the level of functionality for the destination node and the level of functionality for the first node, that is available to both the destination node and the first node; and adjusting an operating level of functionality of the destination node and an operating level of functionality of the first node to the appropriate level of functionality in performing the requested operation within the system.

7. The method of claim 6, further comprising:

specifying a role for each node of the plurality of nodes operating in the system;

mapping, in a reference framework, the role of each node to the level of functionality that is selected based on the specified role; and implementing each node of the plurality of nodes to operate at an intrinsic level of functionality and all sub-levels lower than the intrinsic level.

\* \* \* \* \*

UNITED STATES PATENT AND TRADEMARK OFFICE
CERTIFICATE OF CORRECTION

PATENT NO. : 7,599,305 B2
APPLICATION NO. : 10/379628
DATED : October 6, 2009
INVENTOR(S) : Thomas T. Bui It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1348 days.

Signed and Sealed this

Twenty-eighth Day of September, 2010

David J. Kappos
*Director of the United States Patent and Trademark Office*